United States Patent
Zhang

(10) Patent No.: US 9,571,409 B2
(45) Date of Patent: Feb. 14, 2017

(54) MAXIMUM TRANSMISSION UNIT NEGOTIATION METHOD AND DATA TERMINAL

(71) Applicant: ZTE Corporation, Shenzhen, Guangdong (CN)

(72) Inventor: Yabing Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 102 days.

(21) Appl. No.: 14/413,501

(22) PCT Filed: Jun. 6, 2013

(86) PCT No.: PCT/CN2013/076891
§ 371 (c)(1),
(2) Date: Jan. 8, 2015

(87) PCT Pub. No.: WO2013/170794
PCT Pub. Date: Nov. 21, 2013

(65) Prior Publication Data
US 2015/0180789 A1 Jun. 25, 2015

(30) Foreign Application Priority Data
Sep. 27, 2012 (CN) .......................... 2012 1 0364817

(51) Int. Cl.
*H04L 12/805* (2013.01)
*H04L 12/64* (2006.01)

(52) U.S. Cl.
CPC ......... *H04L 47/365* (2013.01); *H04L 12/6418* (2013.01)

(58) Field of Classification Search
CPC ........ H04L 69/166; H04L 69/24; H04L 69/16; H04L 69/168; H04L 47/36; H04L 47/14; H04L 47/10; H04W 12/06
See application file for complete search history.

(56) References Cited

U.S. PATENT DOCUMENTS

| 2001/0055317 A1 | 12/2001 | Kajizaki |
| 2004/0090922 A1 | 5/2004 | Jason |

(Continued)

FOREIGN PATENT DOCUMENTS

| CN | 101247549 A | 8/2008 |
| CN | 101541049 A | 9/2009 |

(Continued)

OTHER PUBLICATIONS

Supplementary European Search Report in European application No. 13791679.7, mailed on Jul. 1, 2015.

(Continued)

*Primary Examiner* — Jung-Jen Liu

(74) *Attorney, Agent, or Firm* — Oppedahl Patent Law Firm LLC

(57) ABSTRACT

Disclosed are a maximum transmission unit (MTU) negotiation method and a data terminal. The method comprises: a data terminal receiving a first request message sent by a user terminal during establishment of a communication protocol link and carrying an MTU of the user terminal; updating the MTU of the user terminal carried in the first request message to be a path MTU; sending a second request message carrying the path MTU to a server; receiving a first reply message returned by the server and carrying an MTU of the server; updating the MTU of the server carried in the first reply message to be the path MTU; and sending a second reply message carrying the path MTU to the user terminal. The method and data terminal provided by the present invention can improve network performance.

12 Claims, 3 Drawing Sheets

(56) References Cited

U.S. PATENT DOCUMENTS

| | | | |
|---|---|---|---|
| 2004/0218550 A1 | 11/2004 | Kim | |
| 2007/0136481 A1* | 6/2007 | Dierks | H04L 69/24 |
| | | | 709/228 |
| 2008/0101382 A1 | 5/2008 | Bannerjee | |
| 2010/0306391 A1 | 12/2010 | Mason | |
| 2012/0201136 A1* | 8/2012 | Williams | H04W 28/0273 |
| | | | 370/231 |

FOREIGN PATENT DOCUMENTS

| | | |
|---|---|---|
| CN | 101924689 A | 12/2010 |
| CN | 102594677 A | 7/2012 |
| CN | 102868609 A | 1/2013 |

OTHER PUBLICATIONS

International Search Report in international application No. PCT/CN2013/076891, mailed on Sep. 19, 2013.
English Translation of the Written Opinion of the International Search Authority in international application No. PCT/CN2013/076891, mailed on Sep. 19, 2013.

* cited by examiner

MAXIMUM TRANSMISSION UNIT NEGOTIATION METHOD AND DATA TERMINAL

TECHNICAL FIELD

The disclosure relates to the field of a data terminal, and in particular to a method for Maximum Transmission Unit (MTU) negotiation and a data terminal.

BACKGROUND

With the development of technology, a network using a variety of communication protocols plays an important role in various aspects of daily work, study, and life. Performance of such a network is thus a major concern. A Maximum Transmission Unit (MTU) refers to a maximal size of a data packet that can pass through a layer of a communication protocol, and is defined as the sum of a Maximum Segment Size (MSS) and a header length in bytes. In establishing a link of a communication protocol such as a Transmission Control Protocol (TCP), a user terminal and a server will negotiate and exchange MTUs with each other through handshake messages. The smaller MTU of the MTU of the user terminal and the MTU of the server is selected as an MTU to be used in network data transmission after the link is established. In establishing the TCP link, no data packet sent by the user terminal or the server will have a size exceeding the negotiated MTU.

A path MTU is a maximal size of a data packet that can pass through a network path. Both a data packet sent by a user terminal and that by a server may be transmitted as a whole via the path when the path MTU is no less than the negotiated MTU. For example, both the MTU of the user terminal and the MTU of the server may be 1,500 bytes. Then the negotiated MTU negotiated by the user terminal and the server may also be 1,500 bytes. When the path MTU is no less than 1,500 bytes, a data packet sent by the user terminal or the server may be transmitted in its entirety via the network path. However, when the path MTU is smaller than the negotiated MTU, for example, when the path MTU is smaller than 1,500 bytes, a data packet sent by the user terminal or the server may be transmitted as segments, leading to reduced network performance.

SUMMARY

Embodiments of the disclosure provide a method for MTU negotiation and a data terminal capable of preventing reduced network performance caused by a path MTU smaller than an MTU of a user terminal and an MTU of a server.

A method for Maximum Transmission Unit (MTU) negotiation includes:

receiving, by a data terminal, a first request sent by a user terminal in establishing a link of a communication protocol, the first request including an MTU of the user terminal;

updating the MTU of the user terminal included in the first request to a path MTU;

sending a server a second request including the path MTU, such that the server determines an MTU to be used after the link of the communication protocol is established by comparing the path MTU with an MTU of the server;

receiving a first response returned by the server, the first response including the MTU of the server;

updating the MTU of the server included in the first response to the path MTU; and sending the user terminal a second response including the path MTU, such that the user terminal determines the MTU to be used after the link of the communication protocol is established by comparing the path MTU with the MTU of the user terminal.

A data terminal includes:

a receiving unit configured for: receiving a first request sent by a user terminal in establishing a link of a communication protocol, the first request including a Maximum Transmission Unit (MTU) of the user terminal; and receiving a first response returned by a server, the first response including an MTU of the server;

an updating unit configured for: updating the MTU of the user terminal included in the first request to a path MTU; and updating the path the MTU of the server included in the first response to the path MTU; and a sending unit configured for: sending the server a second request including the path MTU, such that the server determines an MTU to be used after the link of the communication protocol is established by comparing the path MTU with the MTU of the server; and sending the user terminal a second response including the path MTU, such that the user terminal determines the MTU to be used after the link of the communication protocol is established by comparing the path MTU with the MTU of the user terminal.

Beneficial effect of embodiments of the disclosure is as follows.

According to an embodiment of the disclosure, in establishing a link of a communication protocol, an MTU in a handshake message is updated to a path MTU. When receiving a handshake message including an MTU, a user terminal and a server will select a smaller one of the MTU and a local MTU as an MTU to be used after the link of the communication protocol is established, thus ensuring that the MTU used after establishment of the link between the user terminal and the server does not exceed the path MTU. That is, the size of a data packet to be transmitted in a network will not exceed the path MTU, thereby avoiding segmented data packet transmission, improving network performance.

BRIEF DESCRIPTION OF THE DRAWINGS

A drawing illustrated herein is provided for further understanding of the disclosure, forms a part of the disclosure, and together with an embodiment of the disclosure, is for explaining the disclosure, without forming improper limitations to the disclosure.

DETAILED DESCRIPTION

Embodiments of the disclosure provide a method for MTU negotiation and a data terminal with improved network performance. An embodiment of the disclosure is described with reference to the drawings. Note that an embodiment described herein is only intended for illustrating and explaining the disclosure instead of limiting the disclosure. The embodiments of the disclosure and features therein may be combined with each other as long as no conflict results from the combination.

Figure 1:
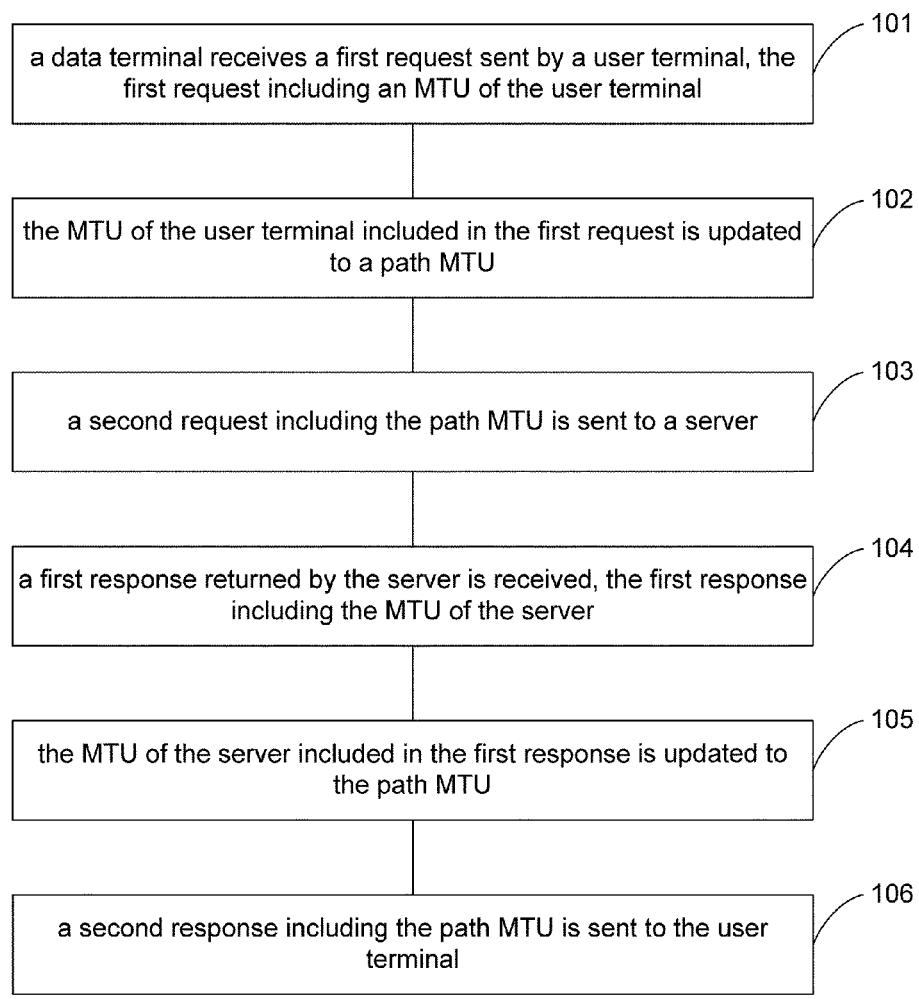
FIG. 1 is a flowchart of a method for MTU negotiation according to an embodiment of the disclosure.

An embodiment of the disclosure provides a method for MTU negotiation. As shown in FIG. 1, the method includes steps as follows.

In Step 101, a data terminal receives a first request sent by a user terminal in establishing a link of a communication protocol. The first request includes an MTU of the user terminal.

In Step 102, the MTU of the user terminal included in the first request is updated to a path MTU.

In Step 103, a second request including the path MTU is sent to a server. The server determines an MTU to be used after the link of the communication protocol is established by comparing the path MTU with an MTU of the server.

In Step 104, a first response returned by the server is received. The first response includes the MTU of the server.

In Step 105, the MTU of the server included in the first response is updated to the path MTU.

In Step 106, a second response including the path MTU is sent to the user terminal. The user terminal determines the MTU to be used after the link of the communication protocol is established by comparing the path MTU with the MTU of the user terminal.

The data terminal in the method may be a data card, a drive-free data card or a mobile hot product.

Hereinbelow with reference to the accompanying drawings, the method provided by the disclosure is elaborated with an embodiment of MTU negotiation in TCP link establishment.

Figure 2:
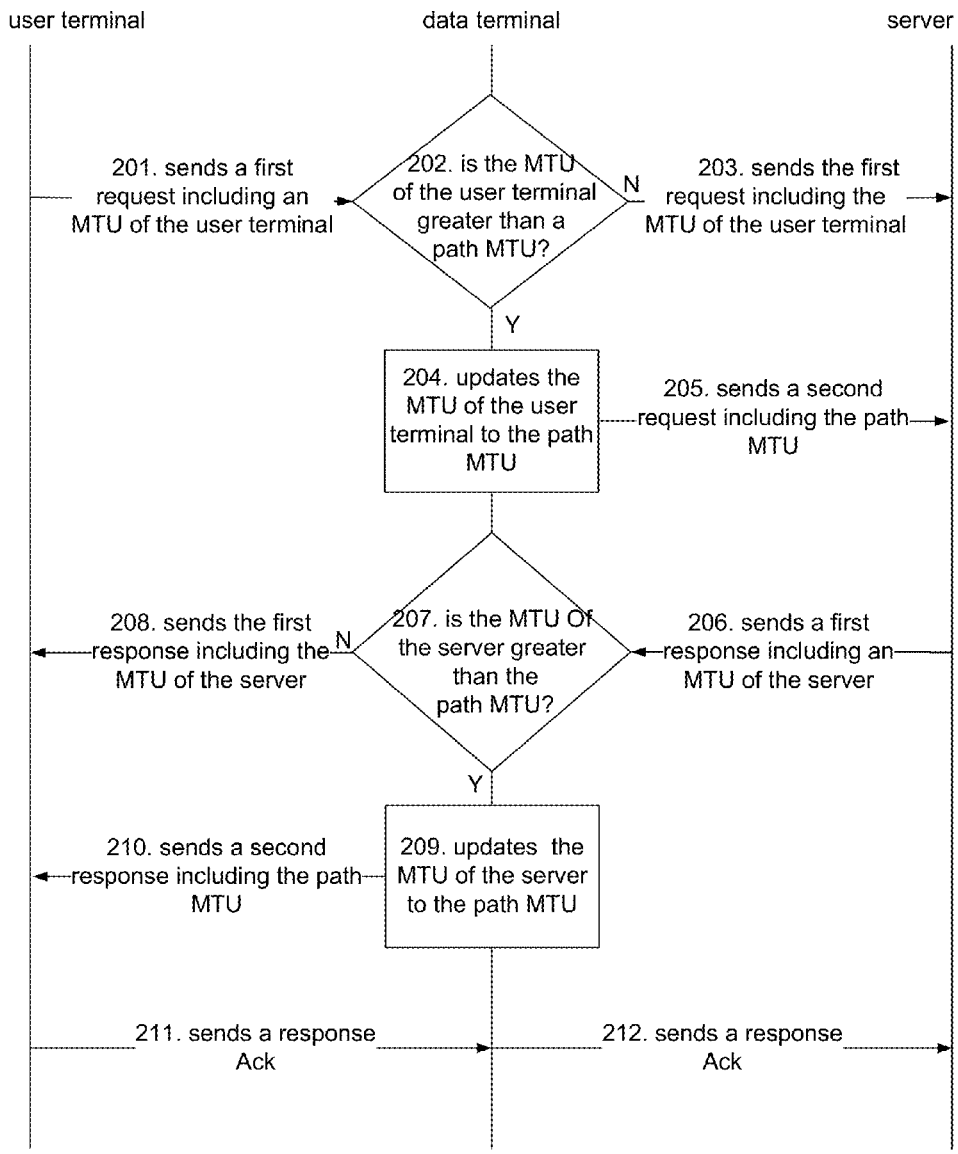
FIG. 2 is a detailed flowchart of a method for MTU negotiation according to an embodiment of the disclosure.

As shown in FIG. 2, a detailed flowchart of a method for MTU negotiation according to an embodiment of the disclosure may include steps as follows.

In Step 201, in establishing a link of a communication protocol, a user terminal sends a data terminal a first request including an MTU of the user terminal.

In establishing the link of the communication protocol, the user terminal may send the data terminal the first request including a header length and an MSS of the user terminal. The sum of an MSS and a header length may be an MTU.

The disclosure is elaborated with an example of MTU negotiation in TCP link establishment.

In establishing a TCP link, the user terminal may send the data terminal a TCP Synchronous (TCP SYN) Sequence Number request including a header length and the MSS of the user terminal.

In Step 202, the data terminal receives the first data request, and determines whether the MTU of the user terminal included in the first request is greater than a path MTU. The flow goes to Step 203 when it is determined that the MTU of the user terminal included in the first request is no greater than the path MTU. The flow goes to step 204 when it is determined that the MTU of the user terminal included in the first request is greater than the path MTU.

The data terminal may receive the first request, and determines whether the MSS of the user terminal included in the first request is greater than a calculated MSS calculated according to the path MTU. The flow may go to Step 203 when it is determined that the MSS of the user terminal included in the first request is no greater than the calculated MSS. The flow may go to step 204 when it is determined that the MSS of the user terminal included in the first request is greater than the calculated MSS.

In establishing the TCP link, in establishing the TCP link, the data terminal may receive a TCP SYN message, and determine whether the MSS of the user terminal included in the TCP SYN message is greater than the MSS calculated according to the path MTU. The flow may go to Step 203 when it is determined that the MSS of the user terminal included in the TCP SYN message is no greater than the calculated MSS. The flow may go to step 204 when it is determined that the MSS of the user terminal included in the TCP SYN message is greater than the calculated MSS.

In Step 203, the data terminal sends the server the first request including the MTU of the user terminal.

The data terminal may send the server the first request including the header length and the MSS of the user terminal.

In establishing the TCP link, in establishing the TCP link, the data terminal may send the server the TCP SYN message including the header length and the MSS of the user terminal.

The flow then may go to Step 206.

In Step 204, the data terminal may update the MTU of the user terminal included in the first request to the path MTU.

The data terminal may update the MSS of the user terminal included in the first request to the calculated MSS calculated according to the path MTU.

In establishing the TCP link, the data terminal may update the MSS of the user terminal included in the TCP SYN message to the calculated MSS calculated according to the path MTU.

In Step 205, the data terminal sends the server a second request including the path MTU.

The data terminal may send the server the second request including the header length and the calculated MSS calculated according to the path MTU.

In establishing the TCP link, the data terminal may send the server the TCP SYN message including the header length and the calculated MSS calculated according to the path MTU.

In Step 206, the server receives the first request including the MTU of the user terminal or the second request including the path MTU, and sends the data terminal a first response including an MTU of the server.

When receiving the first request, the server may compare the MTU of the user terminal included in the first request with the MTU of the server, and select the smaller MTU thereof as an MTU to be used after the link of the communication protocol is established.

When receiving the second request, the server may compare the path MTU included in the second request with the MTU of the server, and select the smaller MTU thereof as the MTU to be used after the link of the communication protocol is established.

This step may specifically include steps as follows.

The server may receive the first request including the header length and the MSS of the user terminal or the second request including the header length and the calculated MSS calculated according to the path MTU, and send the data terminal the first response including the header length and the MSS of the server.

In establishing the TCP link, the server may receive a TCP SYN message including the header length and the MSS of the user terminal or a TCP SYN message including the header length and the calculated MSS calculated according to the path MTU, and send the data terminal a TCP SYN acknowledgement (TCP SYN ACK) including the header length and the MSS of the server.

In Step 207, the data terminal receives the first response sent by the server, and determines whether the MTU of the server included in the first response is greater than the path MTU. The flow goes to Step 208 when it is determined that the MTU of the server included in the first response is no greater than the path MTU. The flow goes to step 209 when it is determined that the MTU of the server included in the first response is greater than the path MTU.

The data terminal may receive the first response sent by the server, and determine whether the MSS of the server included in the first response is greater than the MSS calculated according to the path MTU. The flow may go to Step 208 when it is determined that the MSS of the server included in the first response is no greater than the calculated MSS. The flow may go to step 209 when it is determined that the MSS of the server included in the first response is greater than the calculated MSS.

In establishing the TCP link, the data terminal may receive a TCP SYN ACK sent by the server and determine whether the MSS of the server included in the TCP SYN ACK is greater than the MSS calculated according to the path MTU. The flow may go to Step 208 when it is determined that the MSS of the server included in the TCP SYN ACK is no greater than the calculated MSS. The flow may go to step 209 when it is determined that the MSS of the server included in the TCP SYN ACK is greater than the calculated MSS.

In Step 208, the data terminal sends the user terminal the first response including the MTU of the server.

The data terminal may send the user terminal the first response including the header length and the MSS of the server.

In establishing the TCP link, the data terminal may send the user terminal a TCP SYN ACK including the header length and the MSS of the server.

The flow may then go to Step 211.

In Step 209, the data terminal updates the MTU of the server included in the first response to the path MTU.

The data terminal may update the MSS of the server included in the first response to the calculated MSS calculated according to the path MTU.

In establishing the TCP link, the data terminal may update the MSS of the server included in the TCP SYN ACK to the calculated MSS calculated according to the path MTU.

In Step 210, the data terminal sends the user terminal a second response including the path MTU.

The data terminal may send the user terminal the second response including the header length and the calculated MSS calculated according to the path MTU.

In establishing the TCP link, the data terminal may send the user terminal a TCP SYN ACK including the header length and the calculated MSS calculated according to the path MTU.

In Step 211, the user terminal receives the first response including the MTU of the server or the second response including the path MTU, and sends a response acknowledgement to the data terminal.

When receiving the first response, the user terminal may compare the MTU of the server included in the first response with the MTU of the user terminal, and select the smaller MTU thereof as the MTU to be used after the link of the communication protocol is established.

When receiving the second response, the user terminal may compare the path MTU included in the second response with the MTU of the user terminal, and select the smaller MTU thereof as the MTU to be used after the link of the communication protocol is established.

The step may include steps as follows.

The user terminal may receive the first response including the header length and the MSS of the server or the second response including the header length and the calculated MSS calculated according to the path MTU, and may send the response acknowledgement to the data terminal.

In establishing the TCP link, the user terminal may receive a TCP SYN ACK including the header length and the MSS of the server or including the header length and the calculated MSS calculated according to the path MTU, and may send the data terminal a TCP SYN ACK Acknowledgement (TCP ACK).

In Step 212, the data terminal receives the response acknowledgement, and sends the response acknowledgement transparently to the server.

In establishing the TCP link, the data terminal may receive the TCP ACK, and may send the TCP ACK transparently to the server.

Thus, the link of the communication protocol is established.

As shown, with the method provided by embodiments of the disclosure. In establishing a link of a communication protocol, an MTU in a handshake message is updated to a path MTU, ensuring that the size of a data packet transmitted in a network does not exceed the path MTU after the link is established, thus avoiding segmented data packet transmission, improving network performance and user experience.

Figure 3:
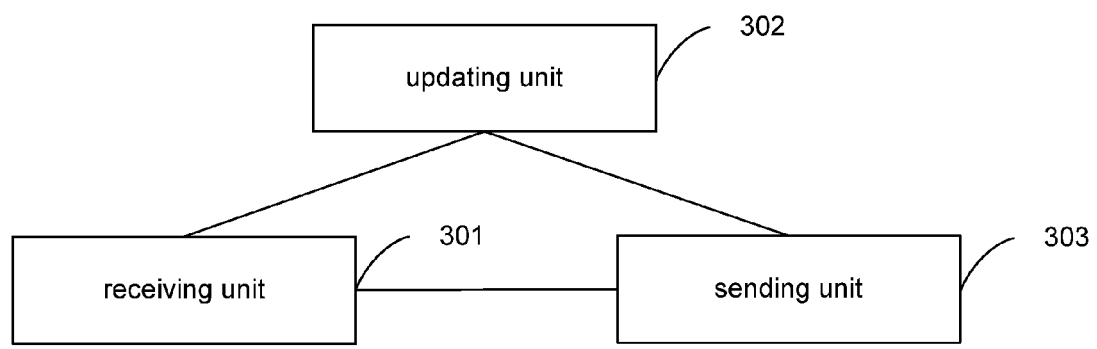
FIG. 3 is a schematic diagram of a structure of a data terminal according to an embodiment of the disclosure.

Based on the same concept, according to a method for MTU negotiation in an embodiment of the disclosure, an embodiment of the disclosure further provides a data terminal, a structure of which is shown in FIG. 3. The data terminal includes units as follows.

A receiving unit 301 is configured for: receiving a first request sent by a user terminal in establishing a link of a communication protocol, the first request including an MTU of the user terminal; and receiving a first response returned by a server, the first response including an MTU of the server.

An updating unit 302 is configured for: updating the MTU of the user terminal included in the first request to a path MTU; and updating the MTU of the server included in the first response to the path MTU.

A sending unit 303 is configured for: sending the server a second request including the path MTU, such that the server determines an MTU to be used after the link of the communication protocol is established by comparing the path MTU with the MTU of the server; and sending the user terminal a second response including the path MTU, such that the user terminal determines the MTU to be used after the link of the communication protocol is established by comparing the path MTU with the MTU of the user terminal.

Further, the updating unit 302 may be configured for: before updating the MTU of the user terminal included in the first request to the path MTU, determining that the MTU of the user terminal included in the first request is greater than the path MTU.

Further, the updating unit 302 may be configured for: when it is determined that the MTU of the user terminal included in the first request is no greater than the path MTU, cancelling updating the MTU of the user terminal to the path MTU.

The sending unit 303 may be further configured for sending the server the first request including the MTU of the user terminal.

Further, the updating unit 302 may be further configured for: before updating the MTU of the server included in the first response to the path MTU, determining that the MTU of the server included in the first response is greater than the path MTU.

Further, the updating unit 302 may be configured for: when it is determined that the MTU of the server included in the first response is no greater than the path MTU, cancelling updating the MTU of the server to the path MTU.

The sending unit 303 may be further configured for sending the user terminal the first response including the MTU of the server.

Further, the receiving unit 301 may be configured for: receiving the first request sent by the user terminal in establishing the link of the communication protocol, the first request including a header length and an MSS of the user terminal; and receiving the first response sent by the server, the first response including the header length and an MSS of the server. A sum of an MSS and a header length may be defined as an MTU.

The updating unit 302 may be configured for: updating the MSS of the user terminal included in the first request to a calculated MSS calculated according to the path MTU; and updating the MSS of the server included in the first response to the calculated MSS.

The sending unit 303 may be configured for: sending the server the second request including the header length and the calculated MSS; and sending the user terminal the second response including the header length and the calculated MSS.

To sum up, according to an embodiment of the disclosure, a data terminal may receive a first request sent by a user terminal in establishing a link of a communication protocol. The first request may include an MTU of the user terminal. The MTU of the user terminal included in the first request may be updated to a path MTU. A second request including the path MTU may be sent to a server. The server thus may determine an MTU to be used after the link of the communication protocol is established by comparing the path MTU with an MTU of the server. A first response returned by the server may be received. The first response may include the MTU of the server. The MTU of the server included in the first response may be updated to the path MTU. A second response including the path MTU may be sent to the user terminal. The user terminal may thus determine the MTU to be used after the link of the communication protocol is established by comparing the path MTU with the MTU of the user terminal. With a solution provided by embodiments of the disclosure, network performance may be improved.

Obviously, those skilled in the art may make various modifications and variations to the present disclosure without departing from the spirit and scope of the present disclosure. Thus, if those modifications and variations of the present disclosure fall within the scope of the claims and equivalent solutions thereof, then the present disclosure is also intended to include such modifications and variations.

The invention claimed is:

1. A method for Maximum Transmission Unit (MTU) negotiation, comprising:
   receiving, by a data terminal, a first request sent by a user terminal in establishing a link of a communication protocol, the first request comprising an MTU of the user terminal;
   when the MTU of the user terminal comprised in the first request is greater than a path MTU, the path MTU being a maximal size of a data packet that can pass through a network path, updating the MTU of the user terminal comprised in the first request to the path MTU;
   sending a server a second request comprising the path MTU, such that the server determines an MTU to be used after the link of the communication protocol is established by comparing the path MTU with an MTU of the server;
   receiving a first response returned by the server, the first response comprising the MTU of the server;
   when the MTU of the server comprised in the first response is greater than the path MTU, updating the MTU of the server comprised in the first response to the path MTU; and
   sending the user terminal a second response comprising the path MTU, such that the user terminal determines the MTU to be used after the link of the communication protocol is established by comparing the path MTU with the MTU of the user terminal.

2. The method according to claim 1, further comprising:
   before the updating the MTU of the user terminal comprised in the first request to the path MTU,
   determining whether the MTU of the user terminal comprised in the first request is greater than the path MTU.

3. The method according to claim 2, further comprising:
   when it is determined that the MTU of the user terminal comprised in the first request is no greater than the path MTU, cancelling updating the MTU of the user terminal to the path MTU.

4. The method according to claim 1, further comprising:
   before the updating the MTU of the server comprised in the first response to the path MTU,
   determining whether the MTU of the server comprised in the first response is greater than the path MTU.

5. The method according to claim 4, further comprising:
   when it is determined that the MTU of the server comprised in the first response is no greater than the path MTU, cancelling updating the MTU of the server to the path MTU.

6. The method according to claim 1, wherein the receiving, by a data terminal, a first request sent by a user terminal comprises:
   receiving, by the data terminal, the first request sent by the user terminal in establishing the link of the communication protocol, the first request comprising a header length and a Maximum Segment Size (MSS) of the user terminal, a sum of the MSS and the header length being equal to the MTU of the user terminal;
   the updating the MTU of the user terminal comprised in the first request to the path MTU comprises:
   updating the MSS of the user terminal comprised in the first request to a calculated MSS calculated according to the path MTU;
   the sending a server a second request comprising the path MTU comprises:
   sending the server the second request comprising the header length and the calculated MSS;
   the receiving a first response returned by the server, the first response comprising the MTU of the server comprises:
   receiving the first response returned by the server, the first response comprising the header length and an MSS of the server;
   the updating the MTU of the server comprised in the first response to the path MTU comprises:
   updating the MSS of the server comprised in the first response to the calculated MSS; and
   the sending the user terminal a second response comprising the path MTU comprises:
   sending the user terminal the second response comprising the header length and the calculated MSS.

7. A data terminal, comprising:
   a receiving unit configured for: receiving a first request sent by a user terminal in establishing a link of a communication protocol, the first request comprising a Maximum Transmission Unit (MTU) of the user terminal; and receiving a first response returned by a server, the first response comprising an MTU of the server;

an updating unit configured for: when the MTU of the user terminal comprised in the first request is greater than a path MTU, the path MTU being a maximal size of a data packet that can pass through a network path, updating the MTU of the user terminal comprised in the first request to the path MTU; and when the MTU of the server comprised in the first response is greater than the path MTU, updating the MTU of the server comprised in the first response to the path MTU; and a sending unit configured for: sending the server a second request comprising the path MTU, such that the server determines an MTU to be used after the link of the communication protocol is established by comparing the path MTU with the MTU of the server; and sending the user terminal a second response comprising the path MTU, such that the user terminal determines the MTU to be used after the link of the communication protocol is established by comparing the path MTU with the MTU of the user terminal.

8. The data terminal according to claim 7, wherein the updating unit is configured for: before updating the MTU of the user terminal comprised in the first request to the path MTU, determining whether the MTU of the user terminal comprised in the first request is greater than the path MTU.

9. The data terminal according to claim 8, wherein the updating unit is further configured for: when it is determined that the MTU of the user terminal comprised in the first request is no greater than the path MTU, cancelling updating the MTU of the user terminal to the path MTU.

10. The data terminal according to claim 7, wherein the updating unit is further configured for: before updating the MTU of the server comprised in the first response to the path MTU, determining whether the MTU of the server comprised in the first response is greater than the path MTU.

11. The data terminal according to claim 10, wherein the updating unit is further configured for: when it is determined that the MTU of the server comprised in the first response is no greater than the path MTU, cancelling updating the MTU of the server to the path MTU.

12. The data terminal according to claim 7, wherein the receiving unit is configured for: receiving the first request sent by the user terminal in establishing the link of the communication protocol, the first request comprising a header length and a Maximum Segment Size (MSS) of the user terminal; and receiving the first response sent by the server, the first response comprising the header length and an MSS of the server, wherein a sum of an MSS and a header length is defined as an MTU;

the updating unit is configured for: updating the MSS of the user terminal comprised in the first request to a calculated MSS calculated according to the path MTU; and updating the MSS of the server comprised in the first response to the calculated MSS; and the sending unit is configured for: sending the server the second request comprising the header length and the calculated MSS; and sending the user terminal the second response comprising the header length and the calculated MSS.

* * * * *